United States Patent [19]

Anthias et al.

[11] Patent Number: 5,856,978
[45] Date of Patent: Jan. 5, 1999

[54] MESSAGE QUEUING DISTRIBUTION SERVICES FOR MAIL SYSTEMS

[75] Inventors: Tefcros Anthias, Romsey, United Kingdom; Francois Bernard Dolivo, Waedenswil; Reto Hermann, Buttikon, both of Switzerland; Christos Papadopoulos, Yateley-Camberley, United Kingdom; Robin Williamson, Waedenswil, Switzerland

[73] Assignee: International Business Machines Corporation, Armonk, N.Y.

[21] Appl. No.: 689,626

[22] Filed: Aug. 12, 1996

[30] Foreign Application Priority Data

Aug. 14, 1995 [WO] WIPO ............... PCT/IB95/00637

[51] Int. Cl.$^6$ ................................... H04L 12/54
[52] U.S. Cl. ........................... 370/429; 370/412
[58] Field of Search .................... 370/229, 235, 370/389, 390, 412–428, 429–432, 473, 474; 395/200.3–200.36, 200.68, 200.62, 200.04, 182.02; 379/93.01

[56] References Cited

U.S. PATENT DOCUMENTS

| | | | |
|---|---|---|---|
| 5,424,724 | 6/1995 | Williams et al. | 340/825.05 |
| 5,557,736 | 9/1996 | Hirosawa et al. | 395/180.02 |
| 5,613,108 | 3/1997 | Morikawa | 379/93.01 |
| 5,632,018 | 5/1997 | Otorii | 395/200.04 |

*Primary Examiner*—Hassan Kizou
*Attorney, Agent, or Firm*—Ronald L. Drumheller

[57] ABSTRACT

A message queuing mail system is improved by preventing duplication of mail messages at the source when the same mail message is being sent to a plurality of destinations and also preventing unnecessary later redirection of mail messages in the mail delivery network, without requiring that the mail delivery netowrk have access to a mail directory, by defining addressing information and procedures that create, manipulate, and use the addressing information in a way that ensures that messages are replicated and redirected in the mail delivery network only when required.

24 Claims, 11 Drawing Sheets

| r_1 |
|-----|
| r_2 |
| r_3 |
| ... |
| r_m |

Recipient List

FIG. 3A

| r_1 | ms_1 |
|-----|------|
| r_2 | ms_1 |
| r_3 | ms_2 |
| r_4 | ms_3 |
| ... | ...  |
| r_m | ms_n |

Remote Recipient List

FIG. 3B

| ms_1 | r_1, r_2, ... |
|------|---------------|
| ms_2 | r_3           |
| ms_3 | r_4           |
| ...  |               |
| ms_n | ... , r_m     |

Mail Server Table

FIG. 3C

| q_1 @ qm_1 |
|------------|
| q_2 @ qm_1 |
| q_3 @ qm_2 |
| ...        |
| q_k @ qm_l |

Queue List

FIG. 3D

| q_1 @ qm_1 |
|------------|
| q_2 @ qm_1 |
| ...        |
| q_p @ qm_q |

Queue Sublist

Creating Remote Recipient Table (RRT)

FIG. 5

Creating Queue List

FIG. 6A

Queue Manager Delivery/Rerouting see FIG. 6B

FIG. 6B

FIG. 7 Mail Server Delivery/Redirection

| | |
|---|---|
| a1 | |
| b2 | |
| c1 | |
| d2 | |
| e1 | |

Recipient List

FIG. 8A

| | |
|---|---|
| b2 | MSB |
| c1 | MSC |
| d2 | MSD |
| e1 | MSB |

Remote Recipient List

FIG. 8B

| | |
|---|---|
| a1 | MSA |
| a2 | MSA |
| b1 | MSB |
| b2 | MSB |
| c1 | MSC |
| c2 | MSC |
| d1 | MSD |
| d2 | MSD |
| e1 | MSB |
| e2 | MSE |

Mail Directory (subset)

FIG. 8C

| | |
|---|---|
| MSB | b2, e1 |
| MSC | c1 |
| MSD | d2 |

Mail Server Table

FIG. 8D

| Q_MSB @ QM_3 |
|---|
| Q_MSC @ QM_5 |
| Q_MSD @ QM_6 |

Queue List

FIG. 8E

| MSA | Q_MSA @ QM1 |
|---|---|
| MSB | Q_MSB @ QM3 |
| MSC | Q_MSC @ QM5 |
| MSD | Q_MSD @ QM6 |
| MSE | Q_MSE @ QM7 |

MQ directory (subset)

FIG. 8F

| QSL (QM_4): |
|---|
| Q_MSC@QM_5 |
| Q_MSD@QM_6 |

Queue Sublist (created by QM_3)

FIG. 8G

| QSL (QM_5): |
|---|
| Q_MSC@QM_5 |

Queue Sublist (created by QM_4)

FIG. 8H

| QSL (QM_6): |
|---|
| Q_MSD@QM_6 |

Queue Sublist (created by QM_4)

| MSB | b2 | e1 | MSC | c1 | MSD | d2 |

MESSAGE QUEUING DISTRIBUTION SERVICES FOR MAIL SYSTEMS

TECHNICAL FIELD

The present invention relates to an improved message queuing (MQ) mail system for communication between programs in a network.

BACKGROUND OF THE INVENTION

Messaging is a store and forward, asynchronous message transfer system whose basic purpose is to allow applications to communicate without requiring that the origin and the destination applications be active simultaneously. The system stores the messages when necessary and delivers the information when resources become available. A first example of messaging is electronic mail, e.g., X.400 message handling system and simple mail transfer protocol (SMTP). In today's world of client/server computing the requirements for business solutions based on messaging has broadened and deepened way beyond basic electronic mail: workflow computing, mobile messaging, transactional messaging, object messaging, data replication services are emerging technologies that are all built on the messaging style of program-to-program communication. New requirements on messaging systems have also been driven by the need for programs to interoperate across disparate operating system platforms and networks (wired and wireless).

Messaging has become a fundamental technology in providing program-to-program communication. Various companies have developed message-oriented middleware (MOM) that supplies a flexible messaging infrastructure. IBM is delivering a commercial strength messaging system, MQSeries, that provides assured, once only message delivery, and message recoverability. Other known MOM products are: Communications Integrator (Covia), ezBridge (Systems Strategies), and Message Express (Horizon Strategies), to name some.

MOM allows general purpose messages to be exchanged between programs using message queues. Applications communicate over networks by simply putting messages in queues and getting messages from queues. MOM's messaging and queueing (MQ) allow programs to communicate across a network without being linked by a private, dedicated, logical connection. Messages are stored at intermediate nodes in the network until the MQ system is ready to forward them. At their final destination, they are held in queues until the target programs are ready to retrieve and process them. At each node in the network there is a queue manager (QM) that insures that messages reach their target queues and provides the MQ services to applications.

MOM enabled programs do not talk to each other directly, so either program can be busy, unavailable, or simply not running at the same time. A program can decide when it wants to retrieve a message of its queue. In case of wireless communications one could even collect all outgoing information in a queue and submit it to a server when the user gets to a phone or to an office local-area-network (LAN). Incoming mail could be stored in a queue until a link, e.g., a wireless link, to the addressee can be established. MQ is very versatile. One can use it to create one-to-many and/or many-to-one relationships, i.e., a single queue can be serviced by several applications and/or many applications can put messages into the same queue.

MOM is a key piece of middleware that is essential for facilitating the development of distributed business applications. MOM typically provides a very simple high-level application programming interface (API) to its services. Most MOM products make available this API on multiple operating system platforms. This greatly simplifies the development of distributed applications that run on different platforms and communicate over a network. The applications only have to be written to a single interface. Furthermore, MOM hides all the communications from the applications. They operate in ignorance of the network and bear no part of the communication burden such as link establishment, management of the links, etc.

The MQ services offered by MOM are an ideal infrastructure on top of which to build an electronic mail system. A mail system consist of a collection of mail servers that accept mail messages and handle their delivery to the recipients. A mail server is like a post office: mail for a local recipient is delivered to its electronic mailbox and mail addressed to remote recipients is forwarded to other mail servers for further delivery. The mail may visit several mail servers before being delivered. The process of forwarding mail for an intended remote recipient to another mail server is called mail redirection.

To be efficient, a mail system using the MOM's MQ services for transporting its mail should exhibit the following qualities: a message on its way to its recipients should be duplicated only when necessary, i.e., only at the nodes in the MQ network where the routes to recipients diverge, and only one copy of a message should be delivered to each of its recipients.

A mail server handles mail addressed to several recipients by delivering the mail message to the mail box of all the recipient that are local and forwarding the mail to each of the mail servers that are responsible for taking care of the mail for the remote recipients. The routes in the MQ network leaving from the forwarding mail server and leading to all the servers to which the mail has to be forwarded may have common initial sections. Even though the mail is forwarded to different mail servers, only one mail message should be transmitted on the common initial sections of the routes. Duplication of messages should occur only when necessary, i.e., when routes diverge, to avoid an unnecessary loading of the network. Overloading the network needs to be avoided in particular in the situation where the network is heavily used.

Several copies of a message can reach a recipient if the message was redirected to the recipient by several mail servers. Multiple redirection of a given mail message to the same recipient should not happen in a properly designed and configured mail system. It would lead to an unnecessary duplication of messages that overloads the network and wastes computing power and storage at the mail servers. The recipient would have the chore of eliminating duplicate messages unless the receiving mail server get burdened with this task.

It is an object of the present invention to provide a method and appropriate means for preventing all unnecessary duplications of messages in the MQ network and for performing redirection of mail messages only when necessary in a mail system using MOM's MQ services for transport. The method and means described in the present invention thus reduce the load on the mail servers and the message queueing network. They have the further advantage of providing this efficient use of the MQ network for mail transport without requiring the MQ system to have access to the mail directory.

SUMMARY OF THE INVENTION

This has been achieved by a method and network as set forth in the appended claims.

DESCRIPTION OF THE DRAWINGS

The invention is described in detail below with reference to the following schematic drawings.

DEFINITION OF TERMS

Figure 3A:
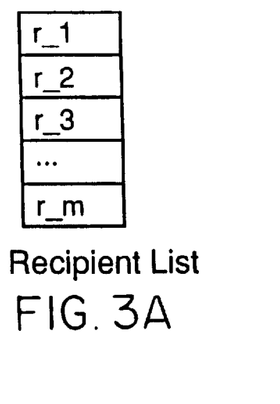
FIG. 3A is an example of a recipient list, in accordance with the present invention.
Figure 3B:
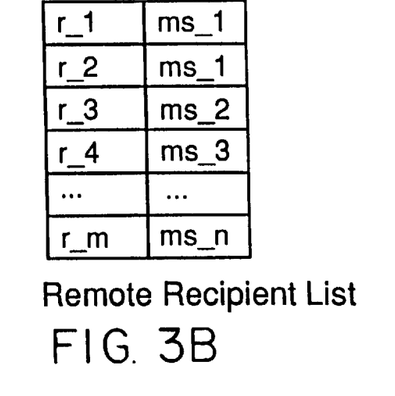
FIG. 3B is an example of a remote recipient table, in accordance with the present invention.
Figure 3C:
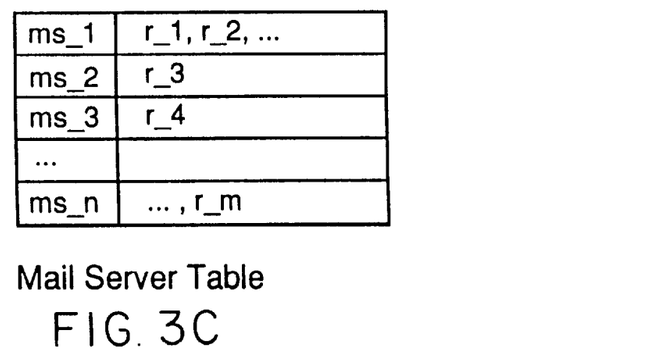
FIG. 3C is an example of a mail server table, in accordance with the present invention.
Figure 3D:
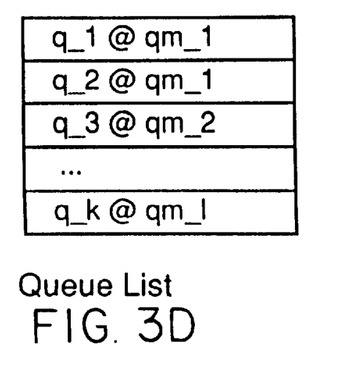
FIG. 3D is an example of a queue list, in accordance with the present invention.
Figure 3E:
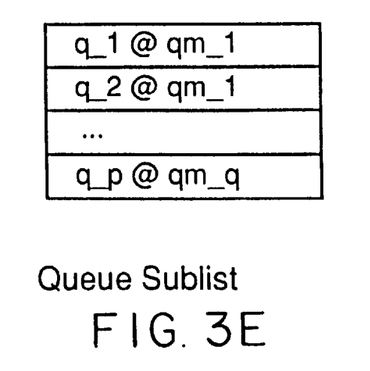
FIG. 3E is an example of a queue sublist, in accordance with the present invention.

The invention is described in detail below with reference to the following terminology:

| | |
|---|---|
| Sender | The sender is the entity, for example an application program, that creates and sends a mail message. |
| Recipient | The recipient is the entity for example an application program, to which mail messages are directed. |
| User | The user is either a sender or a recipient; the term is used where the distinction does not matter. |
| Destination Queue | The destination queue is the entity to which MQ messages are directed. Normally, there is one or several program entities that read what has been put into a destination queue. |
| Queue Manager | The queue manager is the store-and-forward program entity of the MQ messaging system. |
| Mail Server | The mail server is the store-and-forward entity of the mail messaging system. |
| Recipient List | The recipient list (RL) is the list of recipients to which the mail message should be delivered. An example of a recipient list is given in FIG. 3A. |
| Remote Recipient Table | This recipient table, which is associated with a mail message, is organized by mail recipients and indicates for each mail recipient listed in the RL the mail server responsible for handling messages to that recipient. An example of a remote recipient table is given in FIG. 3B. |
| Mail Server Table | The mail server table associated with a mail message is organized by mail servers and indicates for each mail server one or multiple mail recipients for which it assumes responsibility in delivering messages. An example of a mail server table is given in FIG. 3C. |
| Queue List | The queue list (QL) is the list of destination queues to which the MQ message should be delivered. An example of a queue list is given in FIG. 3D. |
| Queue Sublist | The queue sublist is a partition of the queue list of listing queues that share the same responsible queue manager as indicated by the queue table; there are as many queue sublists as there are distinct responsible queue managers in the queue table. An example of a queue sublist is given in FIG. 3E. |
| Mail Directory | The mail directory indicates for each recipient which mail server assumes responsibility in delivering a mail message to that recipient. |
| MQ Directory | The MQ directory indicates for each mail server the destination queue. The MQ directory indicates for each destination queue which queue manager assumes responsibility in delivering a MQ message to that destination queue. |

GENERAL DESCRIPTION

Before the present invention will be described, the problem solved by the invention will be addressed in more detail.

Figure 1:
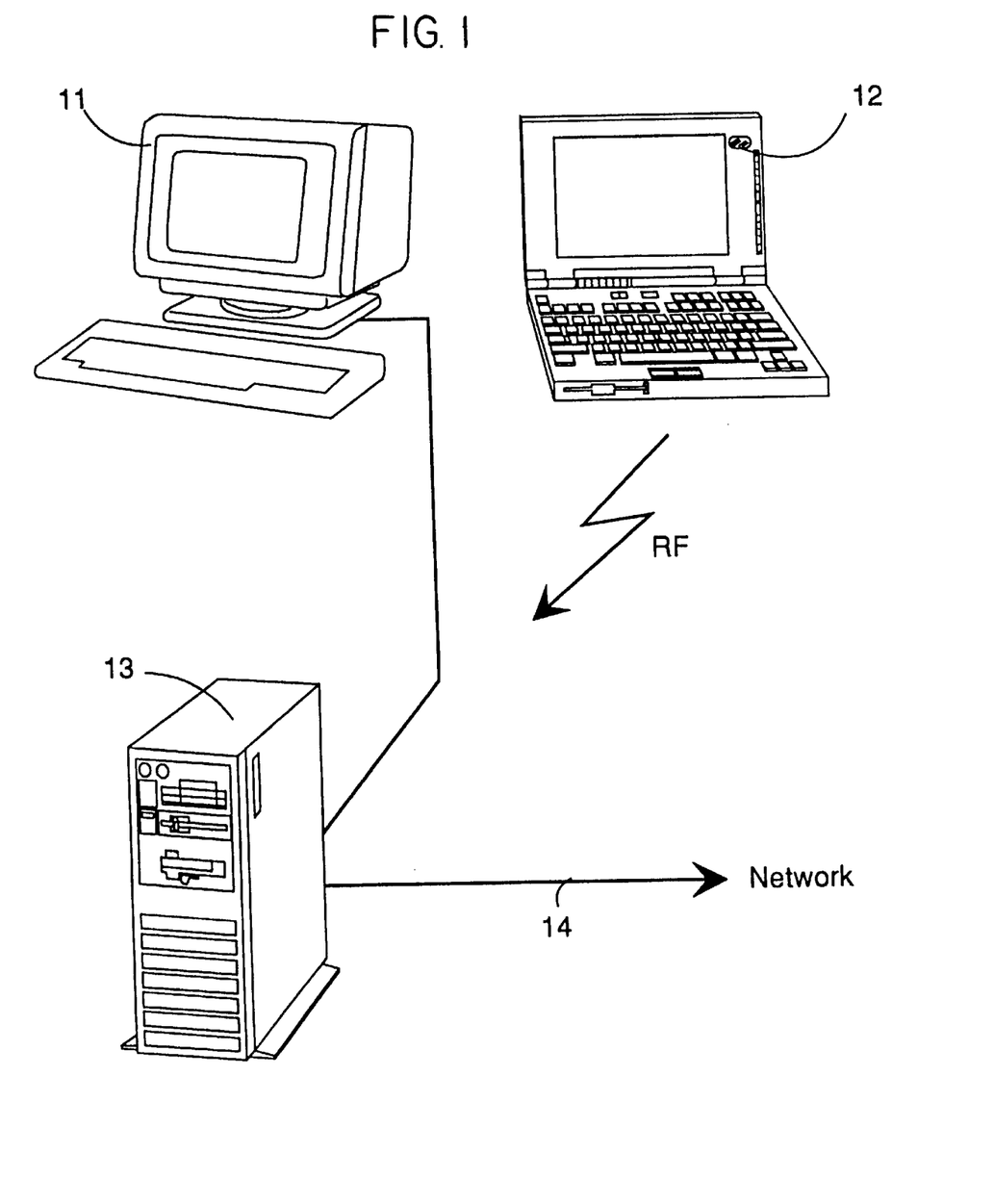
FIG. 1 shows part of a network system with two users which are connected to the network via a computer acting as mail server and queue manager.

FIG. 1 illustrates an example of a small part of a mail system. The block diagram of an entire mail system is given in FIG. 2. As shown in FIG. 1, there are two users 11 and 12 which are connected via a mail server and queue manager 13 to a network 14. The portable computer 12 is linked to the server 13 by means of a RF wireless link.

Figure 2:
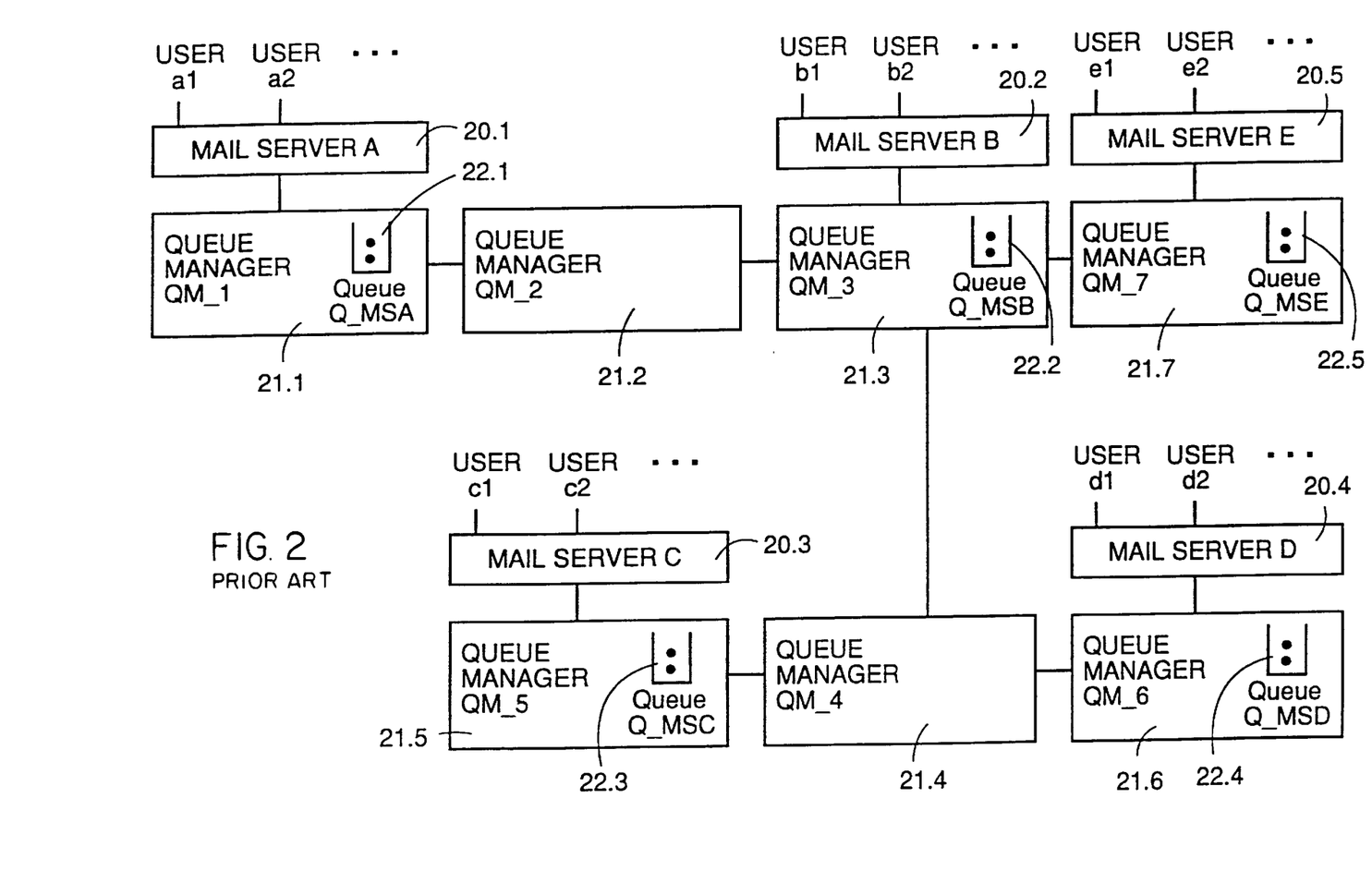
FIG. 2 shows a mail system using a message queueing network for transport of mail messages.

FIG. 2 shows the block diagram of a typical mail system that comprises several mail servers 20.1–20.5 and mail system users a1, a2, b1, b2 etc. served by these mail servers. The system shown in FIG. 2 is an example of a mail system using a messaging and queueing system for transport of messages between mail servers. The MQ system comprises the queue managers 21.1.–21.7.

In the following a simple example is given where user a1 submits a mail message to be sent to user b1 via its local mail server A 20.1. User b1 is local to mail server B 20.2, which gets its messages from the queue Q__MSB 22.2. Mail server A 20.1 encapsulates the mail message in an MQ message and invokes the service from queue manager QM__1 21.1 to put the mail message in Q__MSB @ QM__3 (the '@' symbol means 'at' in the present context). Queue manager QM__1 21.1 transmits it to QM__3 21.3 over the underlying communication network and QM_3 21.3 places the mail message in its local queue Q_MSB 22.2. Mail server B 20.2 then gets the mail message from Q_MSB 22.2 and delivers it to its local user b1.

It is now assumed that the user a1 wants to send a mail message to several users: b2 at mail server B 20.2, c1 at mail server C 20.3, d2 at server D 20.4, and e1 at server E 20.5. One approach for the mail server A 20.1 is to encapsulate the mail message into four MQ messages (there are four addressees in the present example), and put one MQ message in each of the queues Q_MSB @ QM_3, Q_MSC @ QM_5, Q_MSD @ QM_6, and Q_MSE @ QM_7. The consequence of this is an uneconomical use of the communication links connecting the queue managers: four mail messages with identical content would now be sent from QM_1 via QM_2 to QM_3. Two of these messages would then be routed from QM_3 to QM_4.

Mail may be redirected by several mail servers before reaching the server making the final delivery to the recipient's mailbox. In our example, if the mail directory at server A indicates that mail server B is responsible for handling the mail for user e1 then server B will redirect the mail for e1 and forward the mail to server E. Assuming furthermore that the mail directory at server A states that mail servers C and D are responsible for the mail of recipients c1 and d2, respectively. In this case, mail is delivered to recipients c1 and d2 by the queue managers QM_2, QM_3 and QM_4 rerouting the mail message to queue managers QM_5 and QM_6. Therefore, mail server B must redirect the mail only to recipient e1, and not to c1 and d2. Needless redirection to c1 and d2 must be avoided since it would lead to an unnecessary duplication of messages on the MQ network and delivery of two copies of the same message to each of the mail servers C and D.

The present invention prevents any wasteful duplication and redirection of messages by the following means:

definition of addressing information for mail and MQ messaging systems definition of procedures that create, manipulate, and use the addressing information in a way to ensure that messages are replicated and redirected in the network only if required.

In the course of delivering a mail message from the sender to the recipients via a mail system built on top of a MQ system, several operations take place. The entity that created the mail to be sent hands in the mail message and the associated recipient list to its local mail server. The latter accepts the mail message and recipient list, and takes responsibility for delivery of the mail message to the various recipients, putting the mail in the mailboxes of local recipients and forwarding the mail to remote recipients. Mail messages forwarded to remote recipients are submitted to the MQ system for transport. Queue managers at the nodes in the MQ network route the messages to their final destination by performing local delivery and rerouting of MQ messages as appropriate. Mail servers that receive forwarded messages from the MQ system deliver the mail to the recipients that are local and redirect mail addressed to remote recipients by forwarding the mail message to the mail servers responsible for handling the remote recipient's mail by resubmitting the message to the MQ system.

All these operations can be described by four processes: acceptance of mail by the mail server at the originating site, submission of MQ messages to the MQ system by mail servers, delivery/rerouting of MQ message by queue managers, and delivery/redirection of forwarded mail messages by mail servers. The MQ message submission process will be performed by the mail server at the originating site and servers performing mail redirection. To perform their tasks, these processes have to create and manipulate addressing information. Before describing the respective processes in more details, the addressing information that they require is now defined.

Addressing Information:

Mail message destinations are recipients. A mail message is associated with a recipient list RL listing its recipients. The addressing information associated with a single recipient is the name of the recipient and the name of the mail server responsible for handling messages for that recipient. This information is kept in the remote recipient table RRT for each recipient in the recipient list RL who is remote (no addressing information has to be generated for local recipients since mail for local recipients is delivered directly to their mailboxes and does not have to be transported over the MQ network). Organizing the information kept in the remote recipient table RRT by mail servers, rather than recipients, the mail server table MST is obtained. Thus, MST is obtained by inverting RRT and indicates for each mail server the recipients for which this mail server assumes responsibility for delivering messages.

MQ message destinations are queues. An MQ message is associated with a queue list QL listing its destination queues. The destination queue is defined by the name of a queue and the name of a queue manager to which the queue is local.

Creation of Recipient List:

The recipient list RL associated with a mail message is created by the entity that hands in the mail to its local mail server or by a mail server performing mail redirection. An example of a recipient list is given in FIG. 3A.

Figure 4:
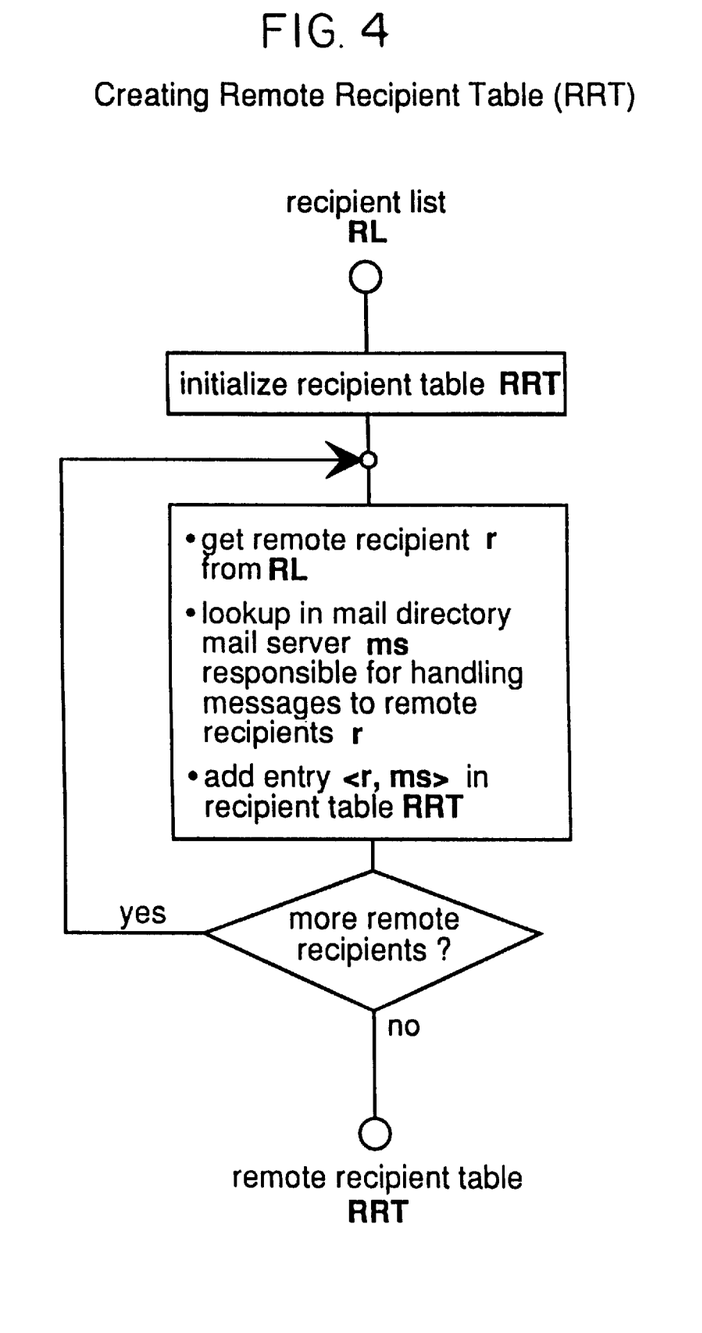
FIG. 4 is a flow chart used to explain the steps carried out when creating a remote recipient table, in accordance with the present invention.

Creation of Remote Recipient Table:

In a mail system there is a mail directory which indicates, for each recipient, the mail server responsible for handling the recipient's mail. It is important to be noted that the mail server identifiers are assumed to be unique across all mail servers. The remote recipient table RRT is created by the mail server during the MQ message submission process by looking up in the mail directory for each remote recipient in the recipient list RL the identifier of the mail server that assumes responsibility in delivering the message to that remote recipient and adding this information together with the remote recipient's name to RRT. The respective process steps are illustrated in FIG. 4 and an example of a remote recipient table is given in FIG. 3B.

Creation of Mail Server Table:

The mail server table MST is obtained during the MQ message submission process by inverting the remote recipient table RRT and indicates for each mail server the recipients for which this mail server is responsible. An example of a mail server table is given in FIG. 3C. Instead of creating a mail server table, one could transmit the remote recipient table with the mail message. In this case, each mail server receiving the mail message and remote recipient table associated needs to operate on the remote recipient table instead of the mail server table.

Figure 5:
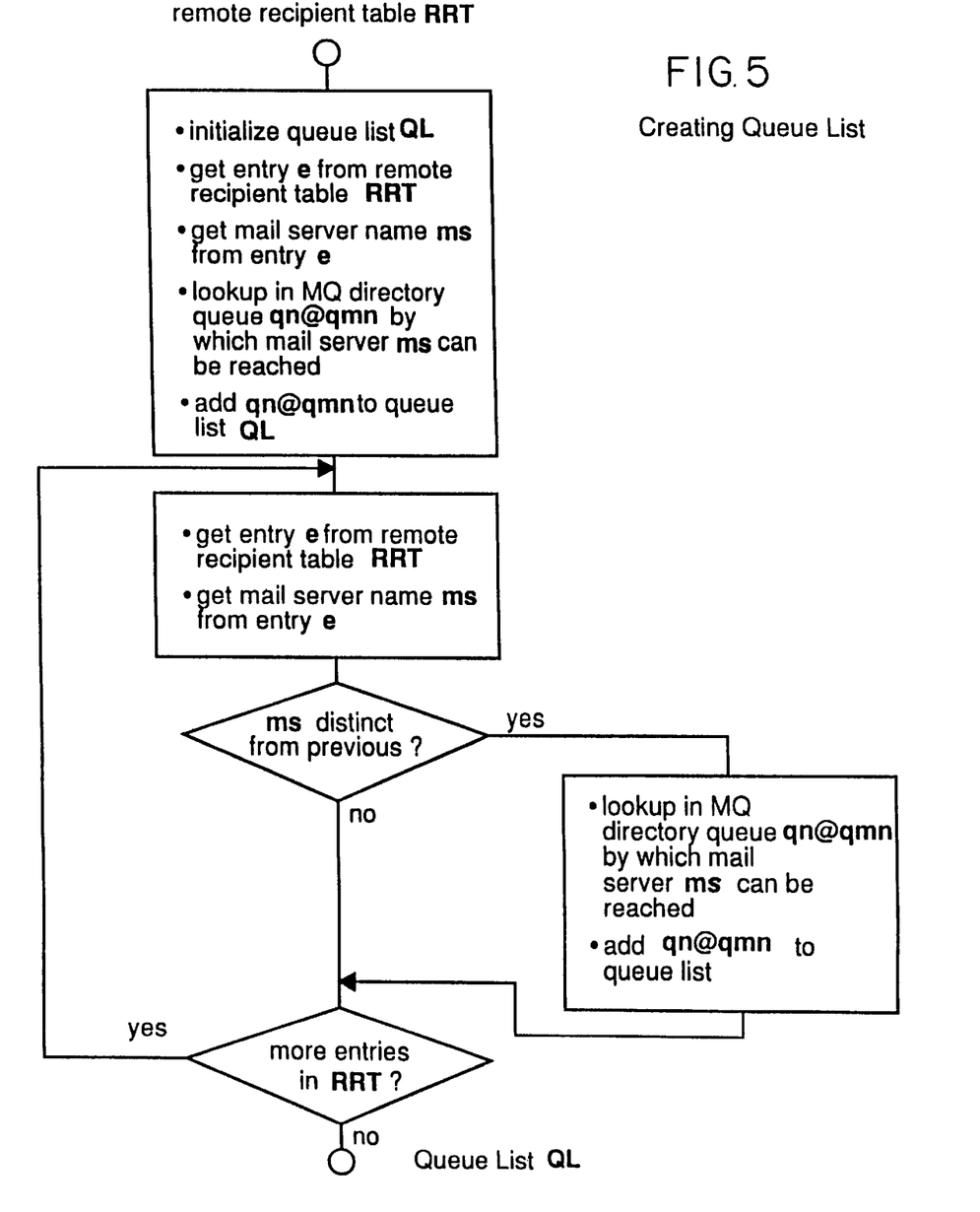
FIG. 5 is a flow chart used to explain the steps carried out when creating a queue list, in accordance with the present invention.

Creation of Queue List:

The queue list QL associated with an MQ message is created by a mail server during the MQ message submission process or by a queue manager performing rerouting. The respective process steps are illustrated in FIG. 5 and an example of a queue list is given in FIG. 3D.

Acceptance of Mail by the Mail Server at the Originating Site:

The mail server at the originating site where the mail is created accepts the mail message and associated recipient list and takes responsibility for the mail delivery. Mail messages for local recipients are directly put into the local recipient's mailboxes. Mail addressed to remote recipients must be forwarded to them by transporting the mail over the MQ network. The mail server performs mail forwarding by invoking the MQ message submission process described below.

MQ Message Submission to the MQ System by the Mail Server:

This process is performed by the mail server at the originating site and servers performing mail redirection. Given a mail message and the associated recipient list, the following steps are performed:

1. The remote recipient table RRT is created based on the remote recipients in the recipient list RL, see FIG. 4.
2. The mail server table MST is created by inverting the remote recipient table RRT. This step is optional, as outlined above.
3. The queue list QL is created based on the remote recipient table RRT, see FIG. 5.
4. The mail message and the mail server table MST are encapsulated in an MQ message.
5. The MQ message is submitted with the queue list QL to the queue manager.

Figure 6A:
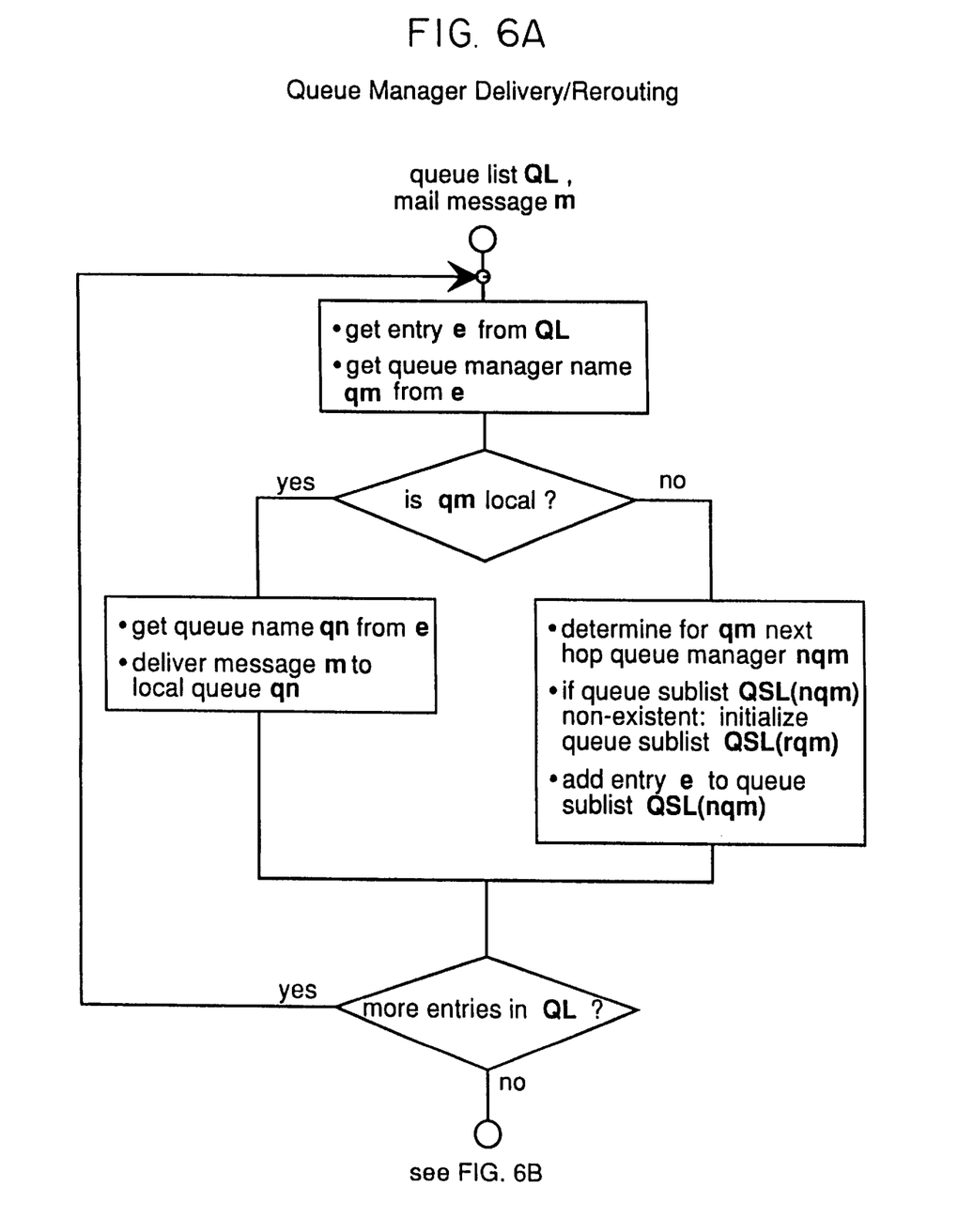
FIG. 6 is a flow chart used to explain the steps carried out by a queue manager when it received a mail message with associated queue list, in accordance with the present invention.
Figure 6B:
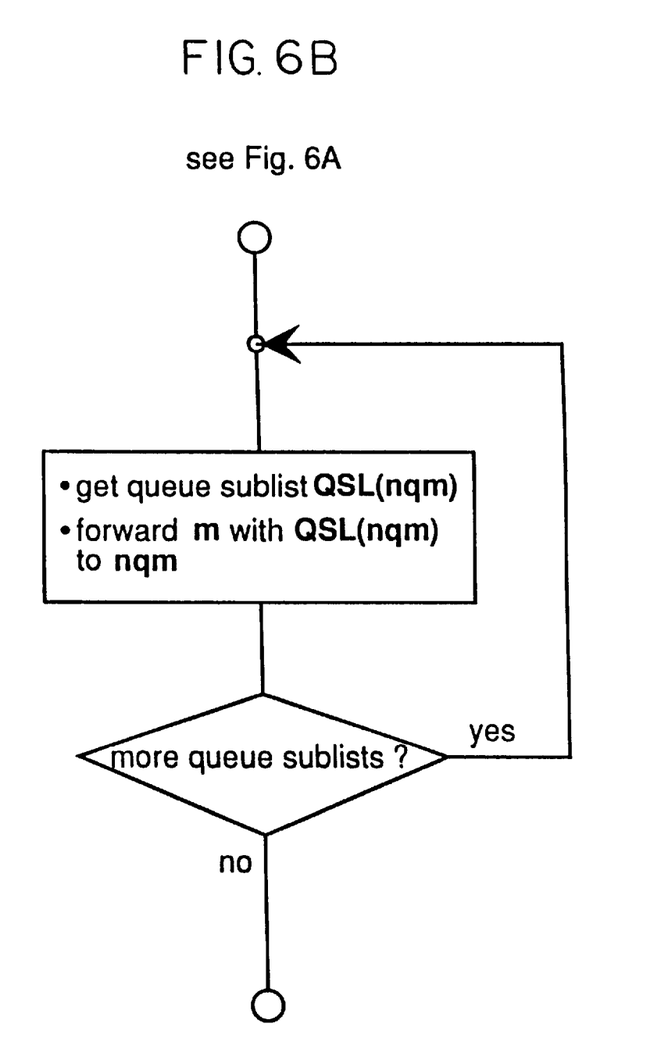

Queue Manager Delivery/Rerouting:

The queue manager can receive an MQ message and the associated queue list QL from two sources: (1) from a mail server performing the MQ message submission process and (2) from an adjacent queue manager. The MQ message contains the encapsulated mail message including its associated mail server table MST. Based on the queue list QL the queue manager has to decide for each destination queue listed whether it is local, in which case the message is put into the queue, or whether it is remote. In the latter case the queue manager determines the next queue manager responsible for delivering the message to the destination queue based on the MQ directory and adds the destination queue to the queue sublist QSL of that next hop queue manager. Once all destination queues from the queue list QL are processed that way, the queue manager forwards to every next hop queue manager a copy of the MQ message with a new associated queue list which equals the queue sublist for that next queue manager. The respective process steps are illustrated in FIG. 6.

Figure 7:
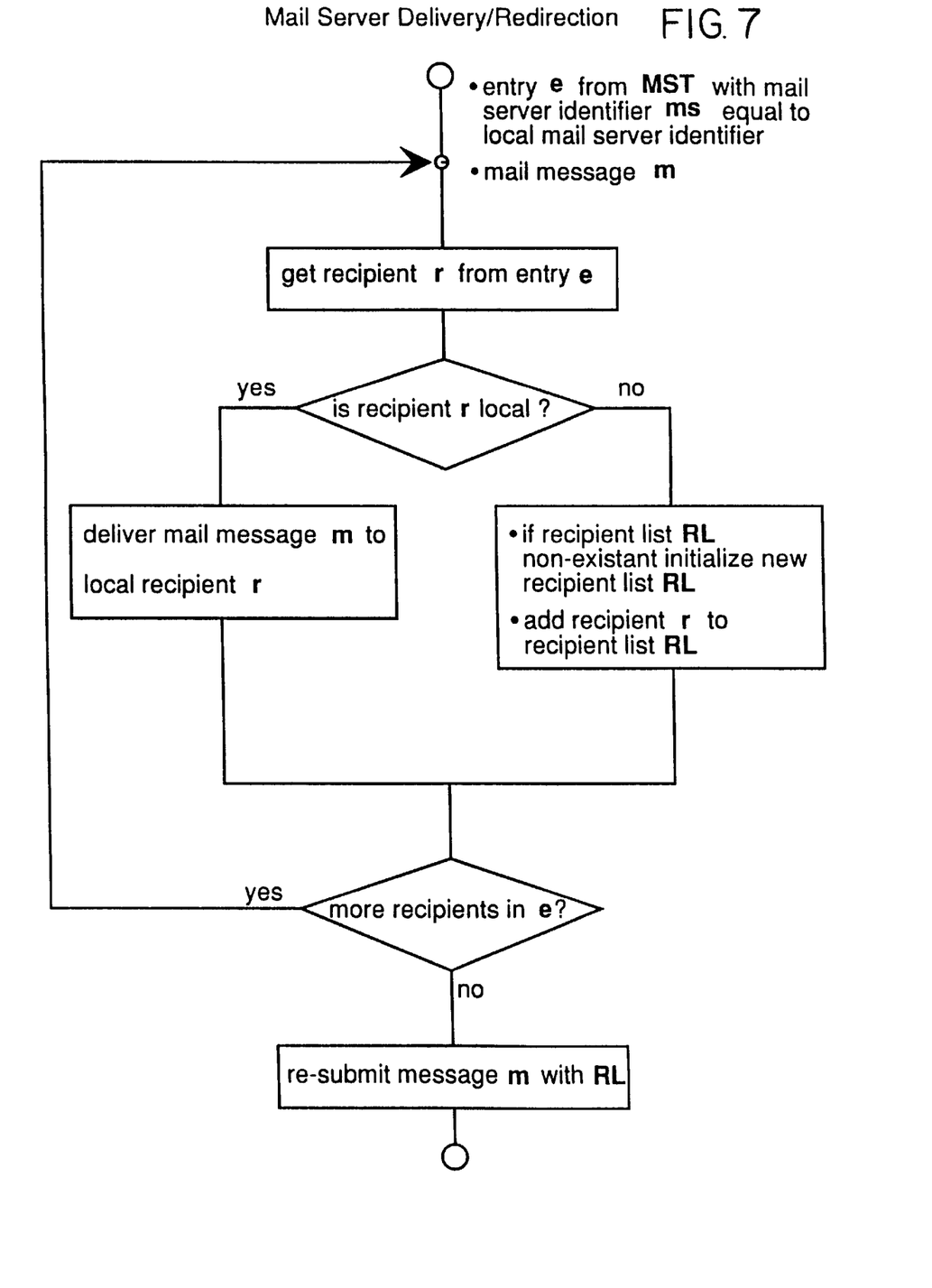
FIG. 7 is a flow chart used to explain the steps carried out by a mail server when it receives a mail message with its entry in the mail server table, in accordance with the present invention.

Mail Server Delivery/Redirection of Forwarded Mail Messages:

A mail server that receives a message from the MQ system extracts the mail message and associated mail server table MST from the MQ message. The entry of the MST with the mail server's identifier indicates to the mail server which recipients it is responsible for. For the recipients which are local, the mail message is delivered to the recipient's mailboxes. For the remote recipients, the mail server creates a recipient list RL and resubmits the mail to the MQ system by performing the MQ message submission process described above. The respective process steps are illustrated in FIG. 7.

Figure 8A:
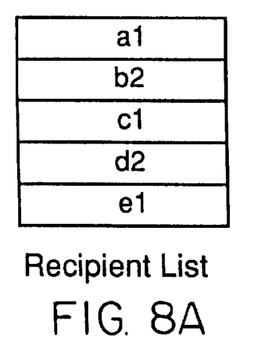
FIG. 8A is an example of a recipient list, in accordance with the present invention.
Figure 8B:
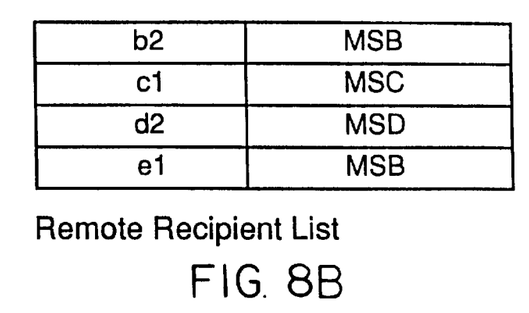
FIG. 8B is an example of a remote recipient table, in accordance with the present invention.
Figure 8C:
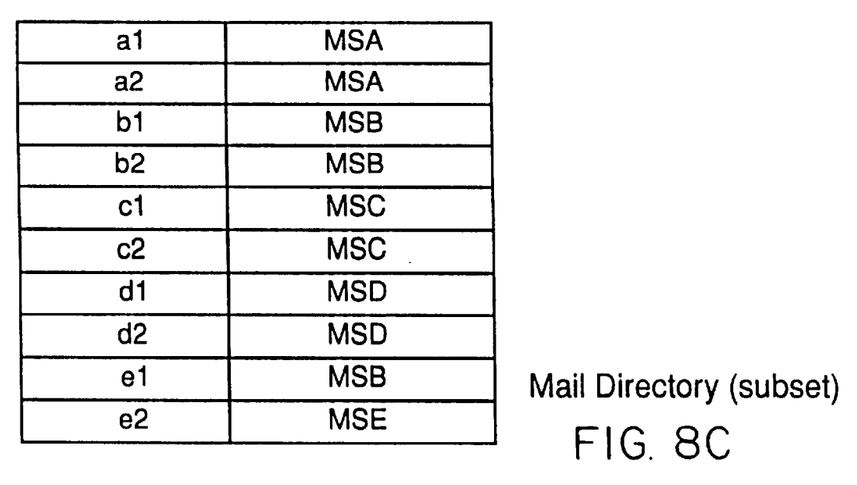
FIG. 8C is an example of a subset of a mail directory, in accordance with the present invention.
Figure 8D:
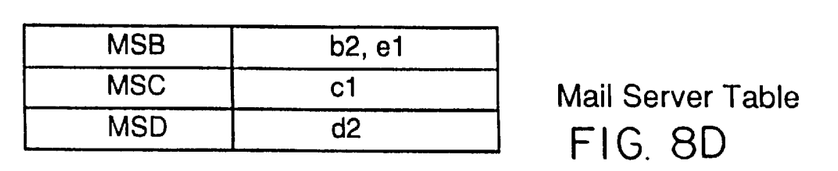
FIG. 8D is an example of a mail server table, in accordance with the present invention.
Figure 8E:
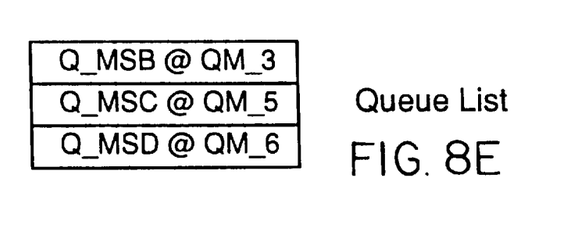
FIG. 8E is an example of a queue list, in accordance with the present invention.
Figure 8F:
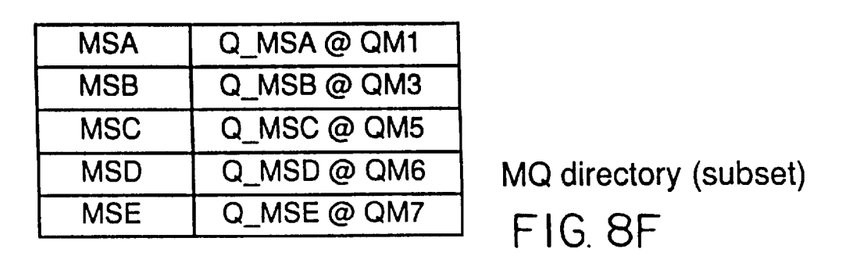
FIG. 8F is an example of a subset of a MQ directory, in accordance with the present invention.

In order to better illustrate the invention, the example described at the beginning of the general description in connection with FIG. 2 is pursued. User a1 prepares a mail message and associates with it a recipient list RL containing the users a1, b2, c1, d2, and e1, as illustrated in FIG. 8A. Given this RL, the mail server A 20.1 delivers the message to the local user a1. Then, the mail server A 20.1 creates the remote recipient table RRT, as illustrated in FIG. 8B, by carrying out the steps given in FIG. 4. FIG. 8C shows a subset of the entries of the mail directory that mail server A 20.1 uses in this process. It is to be noted that the directory entry for user e1 indicates the mail server B 20.2 to be responsible for handling delivery to e1, which will require redirection by mail server B 20.2 (see below). Next, the mail server A 20.1 creates the mail server table MST, as illustrated in FIG. 8D, by inverting the remote recipient table RRT of FIG. 8B. Then, the mail server A 20.1 creates the queue list QL, as illustrated in FIG. 8E, by carrying out the steps given in FIG. 5. FIG. 8F shows a subset of the entries of the MQ directory that the mail server uses in this process. Finally, the mail server A 20.1 encapsulates the mail message and the mail server table MST of FIG. 8D into a single MQ message and submits this together with the queue list Q1 of FIG. 8E to the queue manager QM_1 21.1.

Queue manager QM_1 21.1 performs the delivery/rerouting function, as specified in FIG. 6. A single queue sublist QSL(QM_2) that is equal to the original QL of FIG. 8E results, because the section QM_1-QM_2 is a common part of the routes for this message. Thus a single MQ message gets forwarded to queue manager QM_2 21.2 with a queue list equal to the original QL of FIG. 8E.

Queue manager QM_2 21.2 in turn performs the delivery/rerouting function, as specified in FIG. 6. Again, a single queue sublist QSL(QM_3) that is equal to the original QL of FIG. 8E results, because the section QM_2-QM3 is still a common part of the routes for this message. Again, a single MQ message gets forwarded to queue manager QM_3 21.3 with a queue list equal to the original QL of FIG. 8E.

Queue manager QM_3 21.3 also performs the delivery/rerouting function, as specified in FIG. 6. The first entry of the QL of FIG. 8E comprises the queue manager name QM_3 which is equal to the name of the local queue manager. Correspondingly, QM_3 21.3 delivers a copy of the MQ message to the local queue Q_MSB 22.2. The second entry of the QL of FIG. 8E comprises the queue manager name QM_5. Queue manager QM_3 21.3 determines that QM_4 21.4 is the next hop queue manager towards QM_5 21.5. It initializes a queue sublist QSL (QM_4) and adds the second entry of the QL of FIG. 8E to this queue sublist. Similarly, the third entry of the queue list of FIG. 8E comprises the queue manager name QM_6. Queue manager QM_3 21.3 determines that QM_4 21.4 is again the next hop queue manager towards QM_6 21.6 and, therefore, adds the third entry of the queue list of FIG. 8E also to the queue sublist QSL(QM_4), yielding the result shown in FIG. 8G. Queue manager QM_3 21.3 then forwards the MQ message with a queue list QL=QSL(QM_4) to QM_4 21.4.

Mail server B 20.2 retrieves the MQ message from Q_MSB 22.2 and extracts the mail message and mail server table of FIG. 8D from it. Mail server B 20.2 then performs the mail delivery/redirection function, as specified in FIG. 7. The mail server B 20.2 retrieves its entry from the mail server table MST and handles each recipient listed in turn. It determines that recipient b2 is a local user and delivers the mail message to that users mail box. In case of e1, the mail server B 20.2 recognizes that this user is not local and, hence, the message needs to be redirected. A new recipient list RL is initialized and e1 is put into this RL. Mail server B now resubmits a replica of the mail message with this new RL. It is assumed that the mail directory available to mail server B indicates the proper mail server for user e1, namely mail server E 20.5. The resubmitted message gets handled in the same manner as the original message and will finally be delivered via QM_7 21.7 and mail server E 20.5 to the mailbox of user e1.

Figure 8G:
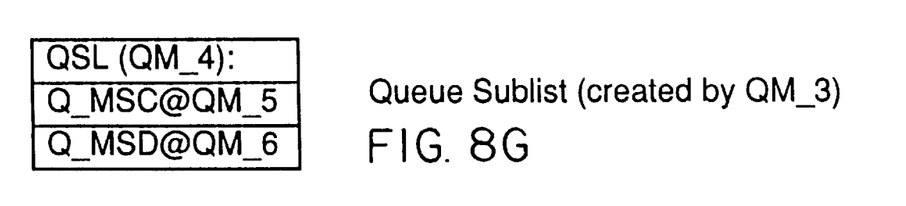
FIG. 8G is an example of queue sublists, in accordance with the present invention.
Figure 8H:
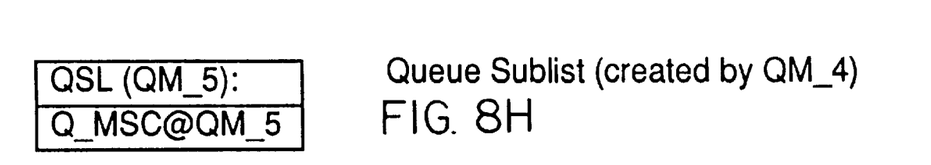
FIG. 8H is an example of queue sublists, in accordance with the present invention.
Figure 8I:
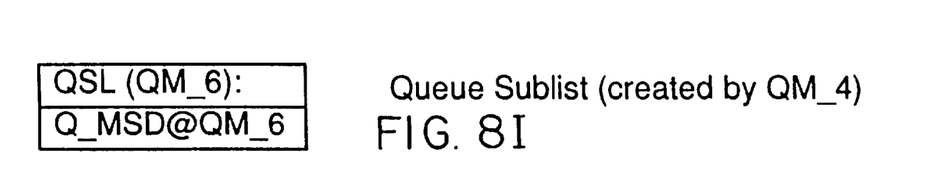
FIG. 8I is an example of queue sublists, in accordance with the present invention.

Queue manager QM_4 21.4 performs the delivery/rerouting function, as specified in FIG. 6, based on the queue list QL=QSL(QM_4) obtained from QM_3 21.3. The first entry of QL=QSL(QM_4) (see FIG. 8G) comprises the queue manager name QM_5. Queue manager QM_4 21.4 determines that QM_5 21.5 is the next (and final) hop queue manager towards QM_5 21.5. It initializes a queue sublist QSL(QM_5) and adds the first entry of QL=QSL(QM_4) to this queue sublist. The second entry of QL=QSL(QM_4) comprises the queue manager name QM_6. Queue manager QM_4 21.4 determines that QM_6 21.6 is the next (and final) hop queue manager towards QM_6 21.6. It initializes a queue sublist QSL(QM_6) and adds the second entry of QL=QSL(QM_4) to this queue sublist. The resulting queue sublists are shown in FIG. 8G. Queue manager QM_4 21.4 then forwards the MQ message with queue lists QL=QSL(QM_5) and QL=QSL(QM_6), respectively, to QM_5 21.5 and QM_6 21.6, respectively.

Queue manager QM_5 21.5 performs the delivery/rerouting function, as specified in FIG. 6, based on the queue list QL=QSL(QM_5) obtained from QM_4 21.4. The first and single entry of QL=QSL(QM_5) (see FIG. 8G) comprises a queue manager name that is equal to its own name QM_5. Correspondingly, the queue manager QM_5 21.5 delivers the MQ message to the local queue Q_MSC 22.3.

Queue manager QM_6 21.6 performs the delivery/rerouting function, as specified in FIG. 6, based on the queue list QL=QSL(QM_6) obtained from QM_4 21.4. The first and single entry of QL=QSL(QM_6) (see FIG. 8G) comprises a queue manager name that is equal to its own name QM_6. Correspondingly, the queue manager QM_6 21.6 delivers the MQ message to the local queue Q_MSD 22.4.

Mail server C 20.3 retrieves the MQ message from Q_MSC 22.3 and extracts the mail message and mail server table from it. Mail server C 20.3 then performs the mail delivery/redirection function, as specified in FIG. 7. The mail server C 20.3 retrieves its entry from the mail server table MST and handles each recipient listed in turn. It determines in this case that the single recipient c1 is a local user and delivers the mail message to that user's mail box.

Mail server D 20.4 retrieves the MQ message from Q_MSD 22.4 and extracts the mail message and mail server table from it. Mail server D 20.4 then performs the mail delivery/redirection function as specified in FIG. 7. The mail server D 20.4 retrieves its entry from the mail server table MST and handles each recipient listed in turn. It determines in this case that the single recipient d2 is a local user and delivers the mail message to that user's mail box.

Figure 9:
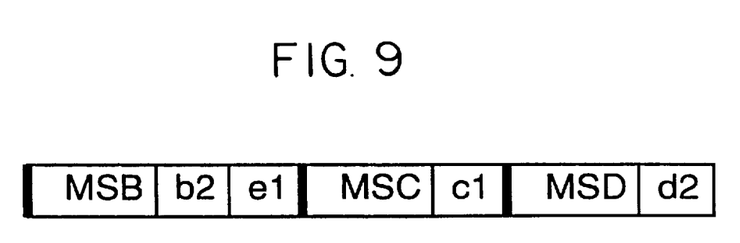
FIG. 9 is another example of a mail server table, in accordance with the present invention.

It is to be understood that the above examples and the lists and tables given in the Figures can be modified. Furthermore, some of the process steps can be carried out parallel in order to speed up the whole process. There are different ways conceivable to arrange the information within such a table or list. Instead of generating a new queue sublist, one can also distinguish the information in the queue list that has already been dealt with from the information which has not yet been dealt with by employing flags or the like. It is also important to note that the different boxes shown in FIG. 2 do not necessarily have to be realized as distinct hardware units. One user's computer could for example act as mail server and queue manager at once, provided that appropriate software and hardware is installed. Instead of using the tables or lists shown in FIGS. 3 and 8, one can also arrange the respective information in sequential order. An example of a sequential mail server table is given in FIG. 9. Such a sequential mail server table can for example be attached to the mail message to be transmitted over the network by inserting it into the mail header.

In summary, the present invention satisfies three key requirements that have to be met by any MQ network in order to provide efficient distribution services to a mail system.

It delivers a mail message to all the recipients in a distribution list without unnecessarily duplicating the mail message on the MQ network;

it allows redirection of mail messages to be performed by the mail system only as appropriate;

it does not require coordination between the directories for the mail and MQ systems.

We claim:

1. Method for transmitting a message from a first user (a1) over a network to destination users (b1, e1), each user (a1, b1, e1) being assigned to a mail server (20.1, 20.2, 20.5) connected to said network such that this mail server can be reached via a queue manager (21.1, 21.2, 21.7), comprising the steps:

1. preparing addressing information for submission of said message from the mail server (20.1) assigned to said first user (a1) over said network to mail servers (20.2, 20.5) assigned to said destination users (b1, e1),
 2. encapsulating said addressing information and message in an MQ message,
 3. creating a queue list (QL) comprising the MQ addresses of those queue managers (21.3, 21.7) through which said mail servers (20.2, 20.5) can be reached,
 4. determining from said queue list (QL) the set of next-hop queue managers and generating associated queue sublists (QSL), and
 5. routing said MQ message to each of said next-hop queue managers together with a queue list (QL) being equal to the queue sublist (QSL) associated with the respective next-hop queue manager, such that said next-hop queue managers now become acting queue managers, each of which,
    i) if said queue manager is found to be a queue manager in said queue list (QL), gets the names of local queues from said queue list (QL) and delivers said message to them,
    ii) repeats steps 4 and 5 until said message has been put in all queues of said queue list (QL),
 6. retrieving said MQ messages and addressing information from said queues of said queue list,
 7. determining from said addressing information the set of destination users assigned to said mail servers, each of which,
    i) if said assigned destination user is local to said mail server, delivers said message to said destination user,
    ii) repeats steps 1–7 for the subset of destination users that is not local until said message has been delivered to all destination users.

2. Method of claim 1 whereby said first user (a1) identifies said destination users (b1, e1) by generating a recipient list (RL) comprising unique identifiers one for each single destination user (b1, e1).

3. Method of claim 2 whereby the mail server assigned to said first user (a1) performs the following steps when receiving said message and associated recipient list (RL), 1. delivering said message to destination users in said recipient list (RL) assigned to the same mail server as said first user (a1), and
 2. preparing addressing information and said message for submission from the mail server (20.1) assigned to said first user (a1) over said network to those destination users in said recipient list (RL) assigned to mail servers other than said mail server assigned to said first user (a1).

4. Method of claim 2 whereby the mail server (20.1) assigned to said first user (a1) carries out the following steps in order to create a mail server table (MST) taking as input said recipient list (RL):
   1. taking information corresponding to a destination user (b1, e1) from said recipient list (RL),
   2. obtaining from a mail directory the identifier of the mail server (MSB) to which said destination user (b1, e1) is assigned,
   3. adding the name of said destination user (b1) and the identifier of said mail server (MSB) obtained to a remote recipient table (RRT),
   4. repeating the above three steps until all destination users (b1, e1) in said recipient list (RL) have been dealt with,
   5. inverting said remote recipient table (RRT) to create said mail server table (MST).

5. Method of claim 4 whereby a particular mail server performs delivery/redirection of said message by executing the following steps:
   1. determining from said mail server table (MST) or remote recipient table (RRT) the set of destination users assigned to said particular mail server,
   2. getting destination user information from the set of assigned destination users,
   3. if said destination user is local then delivering said message to said destination user,
   4. if said destination user is not local then
      i) creating new recipient list, if one does not already exist, and
      ii) adding said destination user to said new recipient list,
   5. repeating steps 2–4 until all destination users from said set of assigned destination users are exhausted,
   6. preparing addressing information and said message for submission to said network for transport to said destination users of said recipient list (RL).

6. Method of claim 5 whereby said particular mail server submits said message and addressing information encapsulated in an MQ message to the queue manager responsible for said mail server for transport to said destination users of said recipient list (RL) over said MQ network by performing the following steps:
   1. creating a remote recipient table (RRT) based on said recipient list (RL) associated with said message,
   2. creating a mail server table (MST) based on said remote recipient table (RRT),
   3. creating a queue list (QL) based on said remote recipient table (RRT),
   4. encapsulating said message and said mail server table (MST) or said remote recipient table (RRT) in an MQ message,
   5. submitting said MQ message with said associated queue list (QL) to said responsible queue manager.

7. Method of claim 6 whereby said mail server carries out the following steps in order to create a remote recipient table (RRT) taking as input said recipient list (RL):
   1. taking information corresponding to a remote destination user from said recipient list (RL),
   2. obtaining from a mail directory the identifier of the mail server to which said remote destination user is assigned,
   3. adding the name of said remote destination user and said mail server identifier to a remote recipient table (RRT),
   4. repeating steps 1–3 until all remote destination users in said recipient list (RL) have been dealt with.

8. Method of claim 7 whereby the mail server carries out the following steps in order to create a queue list (QL) from said remote recipient table (RRT):
   1. taking an entry (e) from said remote recipient table and extracting the mail server identifier from this entry,
   2. obtaining from said MQ directory the MQ address, i.e., the name of the queue to which said mail server is assigned and the name of the queue manager owning said queue,
   3. adding said MQ address to said queue list (QL),
   4. repeating step 1 above and, if said mail server identifier thus obtained is distinct from all previous mail server identifiers, then repeating step 2 above,
   5. repeating step 4 until all entries of the remote recipient table have been exhausted.

9. Method of claim 1 whereby said queue managers perform delivery/rerouting of said MQ message by executing the following steps:
   1. taking an entry from said queue list (QL) associated to said MQ message and determining a queue manager name from that entry,
   2. if said queue manager name is local then getting the respective queue name from said entry and delivering said message to the queue with said name,
   3. if said queue manager name is not local then determining the next-hop queue manager, i.e, the queue manager which shall be the next acting queue manager,
      i) creating a new queue sublist (QSL) for said next-hop queue manager if not already existing, and
      ii) adding said entry to the queue sublist of the respective next-hop queue manager,
   4. repeating steps 1–3 until all entries in said queue list are exhausted,
   5. getting said queue sublist (QSL) for a next-hop queue manager and rerouting said MQ message and said queue sublist (QSL), which becomes the associated queue list (QL) of said MQ message, to said next-hop queue manager,
   6. repeating step 5 until all queue sublists (QSL) are exhausted.

10. Method of claim 1 whereby the entries in said queue list (QL) which has already been dealt with is distinguished from the entries which have not yet been dealt with by labelling the respective entries.

11. Method of claim 1 whereby the entries in said queue list (QL) which has already been dealt with is distinguished from the entries which have not yet been dealt with by deleting said information which has already been dealt with.

12. Method of claim 1 whereby it is determined which destination users (b1, e1) are assigned to which mail servers (20.2, 20.5) by looking up the respective information in a mail directory comprising a unique identifier for each mail server (20.2, 20.5).

13. Network for the transmission of a message from a first user (a1) to destination users (b1, e1), each user (a1, b1, e1) being assigned to a mail server (20.1, 20.2, 20.5) connected to said network such that said mail server can be reached via a queue manager (21.1, 21.2, 21.7), said network comprising:
   1. means for preparing addressing information for submission of said message from the mail server (20.1)

assigned to said first user (a1) over said network to mail servers (20.2, 20.5) assigned to said destination users (b1, e1), 2. means for encapsulating said addressing information and message in an MQ message,
3. means for creating a queue list (QL) comprising the MQ addresses of those queue managers through which said mail servers can be reached,
4. means for determining from said queue list (QL) the set of next-hop queue managers and for generating associated queue sublists (QSL),
5. means for routing said MQ message to each of said next-hop queue managers together with a queue list (QL) being equal to the queue sublist (QSL) associated with the respective next-hop queue manager such that said next-hop queue managers become acting queue managers
6. means for putting said message into a queue of said acting queue manager, if said acting queue manager is found to be a queue manager listed in said queue list (QL),
7. means for repeating the steps carried out by the means for routing and the means for putting until said message has been put in all queues of said queue list (QL),
8. means for retrieving said MQ messages and addressing information from said queues of said queue list,
9. means for determining from said addressing information the set of destination users assigned to said mail servers, each of which,
   i) comprises means for delivering said message to said destination user, if said assigned destination user is local to said mail server,
   ii) and means for repeating the steps carried out by the preceding means for the subset of destination users that is not local until said message has been delivered to all destination users.

14. Network of claim 13 wherein said means for creating a queue sublist (QSL) distinguishes the entries in said queue list which have already been dealt with from those entries which have not yet been dealt with by labelling the respective entries.

15. Network of claim 13 wherein said mail server assigned to said first user (a1) comprises the following means which are employed when it receives said message and an associated recipient list (RL) used to identify all destination users,
   1. means for delivering said message to destination users in said recipient list (RL) assigned to the same mail server as said first user (a1), and
   2. means for preparing addressing information and said message for submission from the mail server (20.1) assigned to said first user (a1) over said network to those destination users in said recipient list (RL) assigned to mail servers other than said mail server assigned to said first user (a1).

16. Network of claim 13 wherein said queue managers perform delivery/rerouting of said MQ message by employing the following means:
   1. means for taking an entry from said queue list (QL) associated to said MQ message and for determining a queue manager name from that entry,
   2. means for getting the respective queue name from said entry and delivering said message to the queue with said name if said queue manager name is local,
   3. means for determining the next-hop queue manager, i.e, the queue manager which shall be the next acting queue manager, if said queue manager name is not local,
      i) means for creating a new queue sublist (QSL) for said next-hop queue manager if not already existing, and
      ii) means for adding said entry to the queue sublist of the respective next-hop queue manager,
   4. means for repeating steps carried out by the means for taking an entry from said queue list, means for getting the respective queue name and means for determining the set of next-hop queue managers, until all entries in said queue list are exhausted,
   5. means for getting said queue sublist (QSL) for a next-hop queue manager and rerouting said MQ message and said queue sublist (QSL), which becomes the associated queue list (QL) of said MQ message, to said next-hop queue manager,
   6. means for repeating the step carried out by said means for getting said queue sublist (QSL) until all queue sublists (QSL) are exhausted.

17. Network of claim 13 wherein said means for creating a queue sublist (QSL) distinguishes the entries in said queue list which have already been dealt with from the entries which have not yet been dealt with by deleting said information which has already been dealt with from said queue list (QL).

18. Network of claim 13 wherein said first user (a1) comprises means for generating a recipient list (RL) comprising addressing information associated with each single destination user used to identify said destination users (b1, e1).

19. Network of claim 13, wherein said means for creating a queue list determine which mail servers (20.2, 20.5) are assigned to said destination users (b1, e1) by looking up the respective information in a mail directory comprising a unique identifier for each mail server.

20. Network of claim 13, wherein the mail server (20.1) to which said first user (a1) is assigned comprises the following means for creating a mail server table (MST) taking as input said recipient list (RL):
   1. means for taking information corresponding to a destination user from said recipient list (RL),
   2. means for obtaining from a mail directory the identifier of the mail server to which said destination users are assigned,
   3. means for adding the name of said destination user and the identifier of said mail server obtained to a remote recipient table (RRT)
   4. means for repeating the steps carried out by the above three means until all destination users in said recipient list (RL) have been dealt with,
   5. means for inverting said remote recipient table (RRT) to create said mail server table (MST).

21. Network of claim 13, wherein the a particular mail server comprises the following means to perform delivery/redirection of said message:
   1. means for determining from said mail server table (MST) or remote recipient table (RRT) the set of destination users assigned to said particular mail server,
   2. means for getting destination user information from the set of assigned destination users,
   3. means for delivering said message to said destination user, if said destination user is local,
   4. means for carrying out the following two steps, if said destination user is not local,
      i) creating new recipient list, if one does not already exist, and
      ii) adding said destination user to said new recipient list, 5. means for repeating steps carried out by said means for getting destination user information, said means for delivering said message to said destination user, and said means for carrying out the above two steps until all destination users from said set of assigned destination users are exhausted, 6. means for preparing addressing information and said message for submission to said network for transport to said destination users of said recipient list (RL).

22. Network of claim 21, wherein said particular mail server employs the below means for submission of said message and addressing information encapsulated in an MQ message to the queue manager responsible for said mail server for transport to said destination users of said recipient list (RL) over said MQ network:

1. means for creating a remote recipient table (RRT) based on said recipient list (RL) associated with said message, 2. means for creating a mail server table (MST) based on said remote recipient table (RRT), 3. means for creating a queue list (QL) based on said remote recipient table (RRT), 4. means for encapsulating said message and said mail server table (MST) or said remote recipient table (RRT) in an MQ message, 5. means for submitting said MQ message with said associated queue list (QL) to said responsible queue manager.

23. Network of claim 22, wherein said mail server comprises the following means to create a remote recipient table (RRT) taking as input said recipient list (RL):

1. means for taking information corresponding to a remote destination user from said recipient list (RL), 2. means for obtaining from a mail directory the identifier of the mail server to which said remote destination user is assigned, 3. means for adding the name of said remote destination user and said mail server identifier to a remote recipient table (RRT), 4. means for repeating steps carried out by the above means of this claim until all remote destination users in said recipient list (RL) have been dealt with.

24. Network of claim 23, wherein the mail server comprises the following means to create a queue list (QL) from said remote recipient table (RRT):

1. means for taking an entry (e) from said remote recipient table and extracting the mail server identifier from this entry, 2. means for obtaining from said MQ directory the MQ address, i.e., the name of the queue to which said mail server is assigned and the name of the queue manager owning said queue, 3. means for adding said MQ address to said queue list (QL), 4. means for repeating the step carried out by said means for taking an entry from said remote recipient table and, if said mail server identifier thus obtained is distinct from all previous mail server identifiers, then repeating the step carried out by said means for obtaining from said MQ directory the MQ address, 5. means for repeating step carried out by the latter means until all entries of the remote recipient table have been exhausted.

* * * * *